United States Patent [19]
Calvignac et al.

[11] Patent Number: 5,197,065
[45] Date of Patent: Mar. 23, 1993

[54] DISTRIBUTION MECHANISM FOR ESTABLISHING COMMUNICATIONS BETWEEN USER INTERFACES OF A COMMUNICATION SYSTEM

[75] Inventors: Jean Calvignac; Jacques Feraud, both of La Gaude; Jean-Pierre Lips, Cagnes-sur-Mer; Bernard Naudin, St. Laurent du Var; Eric Saint-George, La Gaude, all of France

[73] Assignee: International Business Machines Corporation, Armonk, N.Y.

[21] Appl. No.: 576,876

[22] Filed: Sep. 4, 1990

[30] Foreign Application Priority Data

Sep. 26, 1989 [EP] European Pat. Off. ........ 89480154.7

[51] Int. Cl.⁵ ............................................... H04J 3/00
[52] U.S. Cl. ...................................... 370/79; 370/85.7
[58] Field of Search ................... 370/77, 79, 80, 95.1, 370/94.1, 85.7

[56] References Cited

U.S. PATENT DOCUMENTS 4,658,397 4/1987 Kawamura et al. ............... 370/63
5,046,182 9/1991 Hamstra et al. ................... 370/79
5,079,767 1/1992 Perlman ............................. 370/94.3

FOREIGN PATENT DOCUMENTS 00514944 4/1981 European Pat. Off. .
0325220 1/1989 European Pat. Off. .
2734173 8/1979 Fed. Rep. of Germany .

Primary Examiner—Douglas W. Olms
Assistant Examiner—Min Jung
Attorney, Agent, or Firm—Joscelyn G. Cockburn

[57] ABSTRACT

A distribution mechanism includes a scheduling device which partitions a common timing signal with a period T into n slots of t duration each, a configuration table having n addressable locations with each of the n locations storing communication control information and addressable by slot numbers generated by the scheduling device and a distribution buffer device (2) having at least a first and a second part, with each part having n addressable locations addressed by control information provided by the configuration table during each slot period to cause an interface involved in the to be established communications during a selected slot period, to write the information to be transmitted in one part of the distribution buffer and the information to be received by the interface to be read from the other part of the distribution buffer at addresses derived from the communication control information and the slot generated by the schedule means.

12 Claims, 5 Drawing Sheets

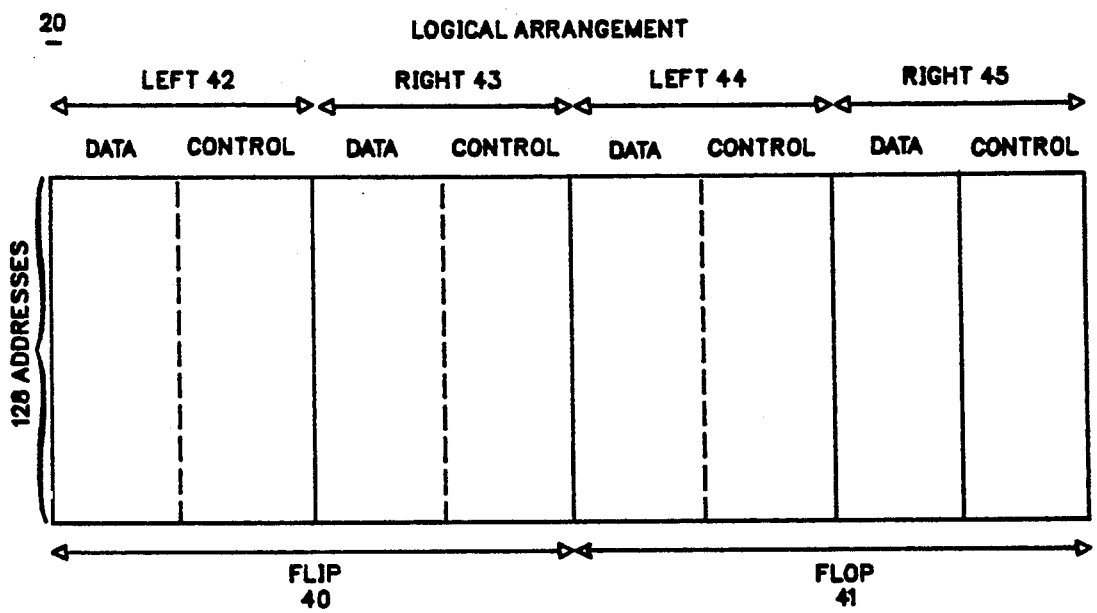
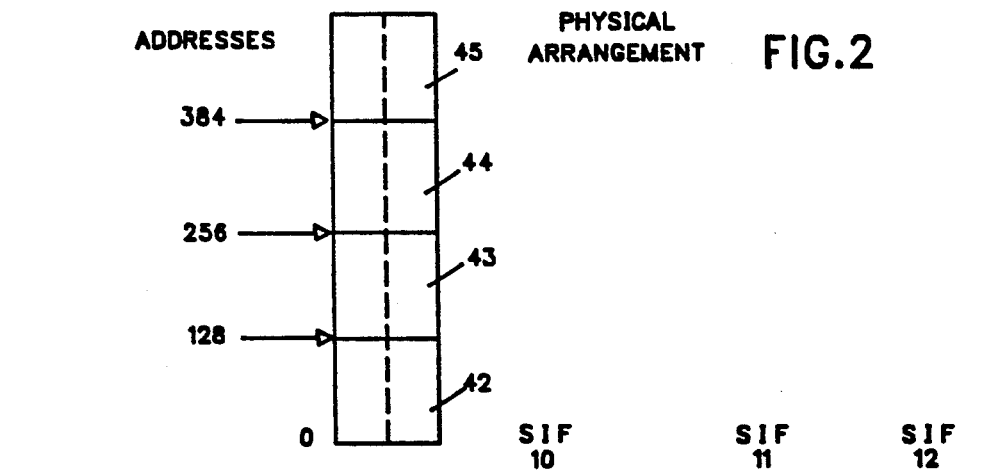
FIG.2
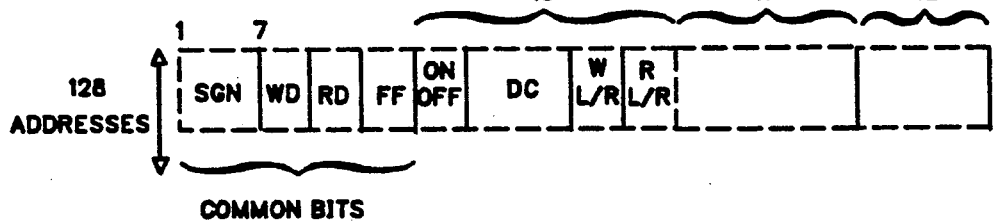
FIG.3

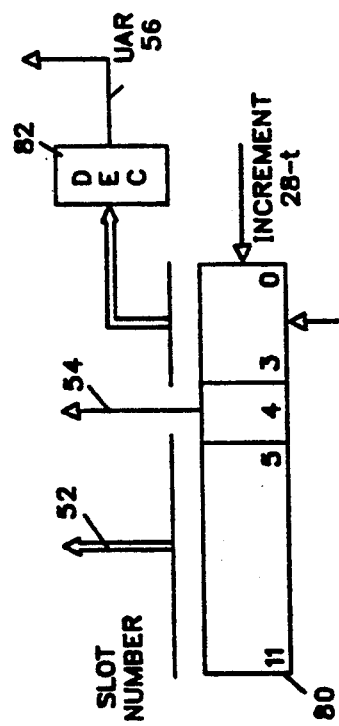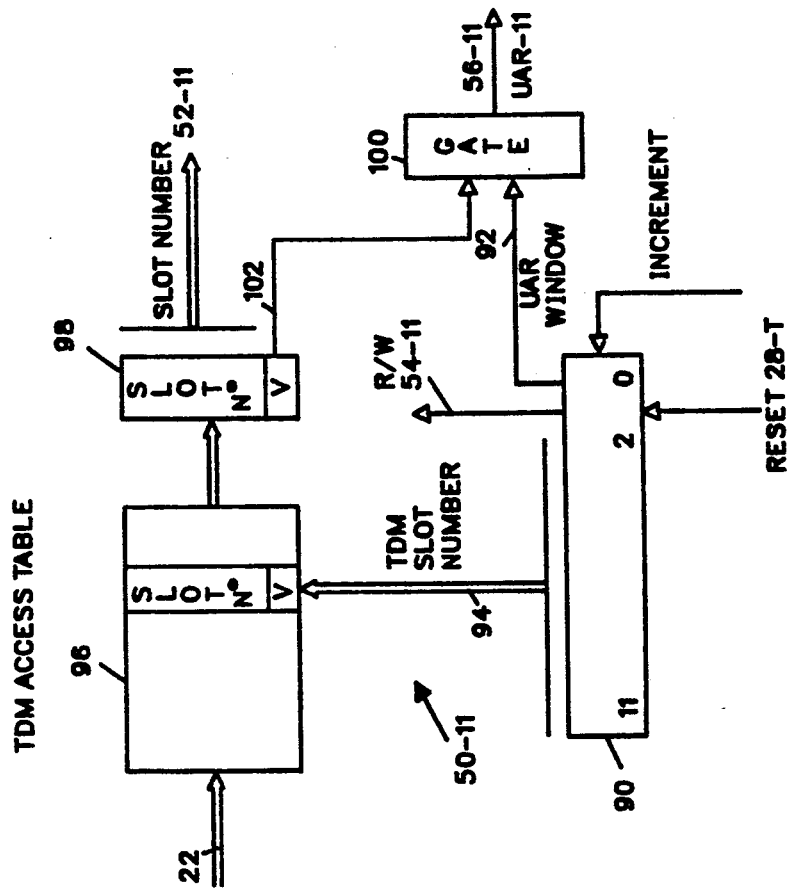

DISTRIBUTION MECHANISM FOR ESTABLISHING COMMUNICATIONS BETWEEN USER INTERFACES OF A COMMUNICATION SYSTEM

DESCRIPTION OF THE INVENTION

1. Field of The Invention

The subject invention relates to a communication system comprising a distribution mechanism able to dispatch information of any types between interfaces of the communication system allowing different types of users to be attached to the communication system.

2. Background of the Invention

In communication control apparatus such as the IBM 3725 or 3745 Communication Controllers, the user equipments are attached to the central control unit which runs the Network Control Program, through communication systems comprising line scanning means and microprocessors.

These communication systems only provide the facility of transferring data from the user equipments to the central control unit and vice and versa.

European patent application EP-A-0 226 688 describes a link adapter to be used in a communication controller comprising data handling means. It allows the communication controller to be attached to a multiplex serial link carrying data and non coded information (such as voice) bits in dedicated slots. The adapter comprises receiving means which dispatch the slot bits either to the data handling means or to an inter adapter high speed bus as a function of the slot content as indicated by a content indication bit. It also comprises transmitting means for providing the data and non coded information slot bits to the serial link. This system requires gating arrangements responsive to the content indication bits to dispatch the slot content. Consequently, it can only be used when the number of information types and flows is limited.

OBJECTS OF THE INVENTION

An object of the present invention is to provide a distribution mechanism which gives a communication system the facility to route any type of information between a plurality of different functional entities attached to or comprised in the communication system.

Another object of the present invention is such a distribution mechanism which is able to establish the communications between two devices in different programmable ways.

SUMMARY OF THE INVENTION

The distribution mechanism according to the present invention is used in a communication system comprising a plurality of interfaces, with each interface connected to at least one user and able to receive and transmit information to said user(s) through information carrying means. It allows communications to be established between users selected by a central control unit in a programmable way. The distribution mechanism comprises:

scheduling means located in each interface and responsive to a common timing signal having a period T, to divide the period into n slot periods having a slot number, n being the number of users connected to that interface to which the maximum number of users are connected, a configuration table comprising n locations, each location assigned to a slot period, the central control unit writing in each location communication control information, said table being addressed by the slot numbers generated by the scheduling means to read and make available, the communication control information, distribution buffer means comprising at least a first and a second part, each part having n addressable locations, distribution buffer addressing means responsive to the communication control information provided by the configuration table during each slot period to cause each interface involved in the to be established communications during that slot period, to write the information to be transmitted in one part of the distribution buffer and to read the information to be received by the interface from the other part of the distribution buffer at addresses derived from the communication control information and the slot number generated by the scheduling means.

In a preferred embodiment of the invention the interfaces are of three types, the first type is the external interface type for connecting the communication system to network users, the second type is the internal interface type for connecting information processing means internal to the communication system to network users attached to the same communication system or to another communication system and the third type is the interconnection interface type for connecting two communication systems through a time division multiplexing means for transferring information between two communication systems in time division slots (Td), the interfaces of the external interface type being the interfaces which are connected to the maximum number of users.

The network users are attached to the interfaces of the external interface type through a serial link on which a period T comprises n slot periods with at least one slot period assigned to one user and possibly a plurality of slots assigned to the same user depending upon the information transfer speed of the user, the slot period $Ts = T/n$ is divided into k subperiods t with $T = n.k.t$, t being substantially equal to the distribution buffer cycle such that $T/n.t = k$ is an integer number, each interface making at least a first and a second user access requests in a slot period in different subperiods t, and providing read/write control signals indicating whether a read or a write access is requested by the interface, the user access requests and read/write control signals causing the addresses of the location of the buffer which is to be accessed by the interface which makes the user access request to be derived from the communication control information read from the configuration table and sent to the distribution buffer addressing means together with the user access request signal and read/write control signals

BRIEF DESCRIPTION OF THE DRAWINGS

FIG. 2 shows the logical and physical arrangements of the distribution buffer shown in FIG. 1.

FIG. 3 shows the format of the control information stored in the configuration table shown in FIG. 1.

FIG. 5 shows the slot identifier and scheduler circuit 50 in the interfaces 10 and 12.

FIG. 6 shows the slot identifier and scheduler circuit 50 in the interface 11.

DETAILED DESCRIPTION OF THE INVENTION

Figure 1:
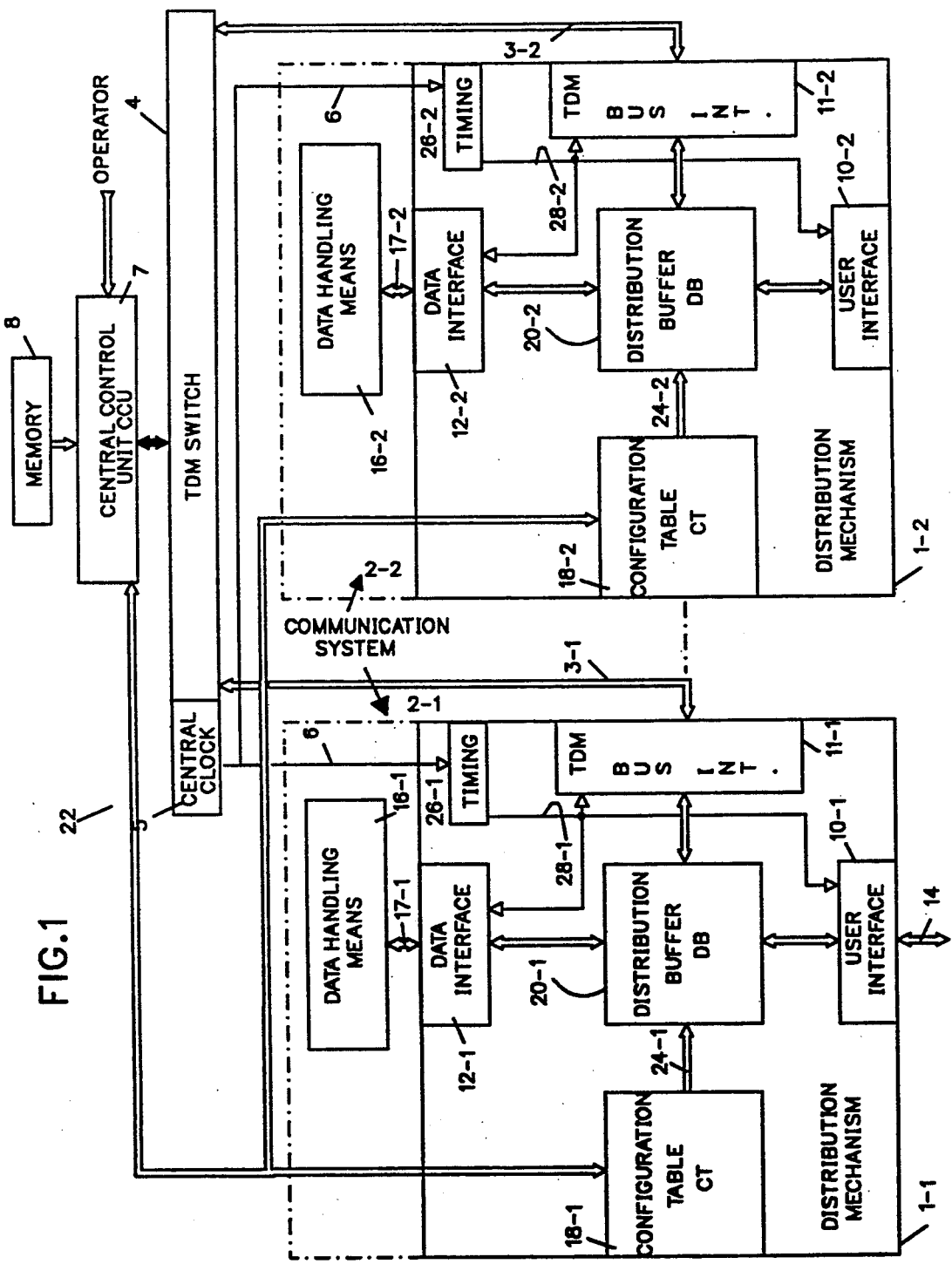
FIG. 1 shows the block diagram of the distribution mechanisms according to the present invention, implemented in two communication systems.

FIG. 1 shows the distribution mechanism according to the present invention when implemented in communication systems connected through a bus switch. In FIG. 1, only two distribution mechanisms 1—1 and 1—2 are shown, they are implemented in two communication systems 2—1 and 2—2, which can communicate through busses 3—1 and 3—2 and time division multiplex TDM bus switch 4.

TDM bus switch 4 comprises a central clock 5 which defines the timing of the whole system by distributing a clock signal to the distribution mechanisms 1—1 and 1—2 on line 6. This signal defines a common cycle T which is the time base of all the distribution mechanisms as will be explained later on.

The communication systems can have access through the TDM bus switch 4 to a central control unit 7 which is part of a communication controller and runs a network control program stored in a memory 8, as is conventional.

The distribution mechanisms 1—1 and 1—2 comprise identical components, referenced by the same numbers with a suffix 1 or 2 to refer to the components in mechanism 1—1 or 1—2, respectively.

Each distribution mechanism comprises as many interfaces as there are entities between which communications need to be established.

In a preferred embodiment of the invention, three interfaces 10, 11 and 12 are provided. One interface 10 called external user interface can be attached to a plurality of external users through a serial link 14 of the type described in patent U.S. Pat. No. 4,760,573 on which at least one time slot is assigned to one user in a T period.

According to the teaching of this US Patent, each time slot is divided into a data part and control part for carrying data and control information respectively.

In a preferred embodiment of the present invention, another interconnection interface called TDM bus interface 11 allows transfer (i.e. transmit or receive) data between communication system through the TDM bus 3 and TDM switch 4.

The third interface is an internal interface called data interface 12. It transfers data and control information to data handling means 16, which is part of the communication systems and which process the data and control information received from or to be sent to another interface 10 or 11.

In a preferred embodiment of the invention, the data handling means only process data packets whereas the TDM switch is able to switch packet and/or circuit slots between the communication systems.

Each distribution mechanism comprises a configuration table CT 18 and a distribution buffer 20.

The distribution buffer 20 is the turntable of the distribution mechanism, wherein all information coming from one of the interfaces are bufferized before being sent to another one. The configuration table 18 is a memory wherein the control unit 7 causes all communication control information which make possible to characterize all the different types of flows between the interfaces, to be loaded through bus 22. This table can be loaded under control of an operator for initialization or diagnostics purposes as will be described later. In operation, it is loaded by the central control unit which writes the communication control information necessary for the establishment of the communications. The configuration table is read each time the distribution buffer is accessed to derive the distribution buffer address which is provided on bus 24. Thus, the distribution buffer 20 associated with the communication control information stored in the configuration table 18 allows synchronous exchanges to be performed for the circuit switch function between the serial link 14 and the parallel TDM bus switch 4, using the same format for the packet or circuit users. It also allows an asynchronous exchange between the data handling means 16 and the serial link 14 for the packet switching function.

The output signal from control clock 5 on line 6 is provided to a timing circuit 26 whose output signal is fed by line 28 to the three interfaces 10, 11 and 12 so as to synchronize the transfer operations between the interfaces as will be described later on.

FIG. 2 shows the logical arrangement of the distribution buffer 20. The distribution buffer comprises two main parts 40 and 41 called FLIP and FLOP buffers respectively which allows operation in flip/flop mode as will be described later on. Each buffer is divided in a left and a right part: left part and right part 42 and 43 in flip buffer 40 and left part and right part 44 and 45 in flop buffer 41.

Each part 42 to 45 is two byte large, one byte being dedicated to the storage of data bytes and the other byte being dedicated to the storage of control bytes.

Also, the memory has a byte select facility to access only a data or control byte in each part.

The external interface 10 in a distribution mechanism can be attached to a plurality of n users. Assuming that T is equal to 125 microseconds, n=128 users working at 64 kilobits per second can be attached to interface 10 through serial link 14. The T period is divided into n=128 slots with one slot assigned to each user for carrying the data and control bits in the data part and control part of the slot. There is one addressable location assigned to each slot in parts 42 to 45 of distribution buffer 20.

The slot assignment depends upon the user speeds. The number of slots which are assigned in a period T to each user depends upon the user speed. For example, two or four slots are assigned to users working at 2×64 kilobits per second or 4×64 kilobits per second, respectively.

Any physical arrangement of the parts 42 to 45 of memory 20 corresponding to the logical arrangement shown in FIG. 2 may be implemented, a specific physical arrangement is shown in FIG. 2.

The configuration table CT 18 also comprises an addressable location for each one of the n=128 slots. The format of the communication control information written into each location of the configuration table by the central control unit is shown in FIG. 3.

Each memory location comprises a first field which comprises bits which are common to each interface 10, 11 and 12 and then three specific fields which are assigned to each interface, said specific fields comprising five bits ON/OFF, two DC bits, W L/R, R L/R.

Obviously, parity bits have to be added to the configuration bits as is conventional, these parity bits are not shown. The function of the communication control information bits is the following:

SGN: Indirect address bits. These bits make possible to set all the distributions of the 128 slots (1 to 128) with all the possible speeds. They can be set to a logical number which groups one or several physical slots assigned to one user. If the indirect addressing mode is used, these SGN bits are the basic address which is used to access the distribution buffer.

For example, if identical SGN bits corresponding to "four" are stored at addresses 0, 2, 3 and 7 of the configuration table and if the indirect addressing mode is used, at each slot, 0, 2, 3 and 7 the basic address of the distribution buffer will be equal to four.

These bits are also used to establish a communication between slots of different numbers on link 14 or 3.

WD: Write Direct. This bit is set to 1 to indicate that the write operations in the distribution buffer are to be made in indirect addressing mode.

RD: Read Direct. This bit is set to 1 to indicate that the read operations in the distribution buffer are to be made in indirect addressing mode.

FF: Flip Flop bit. This bit controls the flip-flop mode as will be described later on.

The bits in the specific fields assigned to each interface have the following functions:

ON/OFF: this bit controls the access to the distribution buffer by the interface. For example, if this bit is set to 0 the interface cannot access the distribution buffer for the corresponding time slot. The interface can thus be isolated from the other interfaces.

DC bits: the two DC bits are coded to indicate whether the data and/ or controls bytes have to be written.

DC=00 no write. Read only operation
DC=01 control byte only
DC=10 data byte only
DC=11 data and control bytes W L/R: this bit indicates whether the write operations have to be performed in the left or right part of the distribution buffer.

R L/R: this bit indicates that the read operations have to be performed in the right part or left part of the distribution buffer.

The distribution mechanism will now be described in more details in reference to FIGS. 4 to 6.

Figure 4:
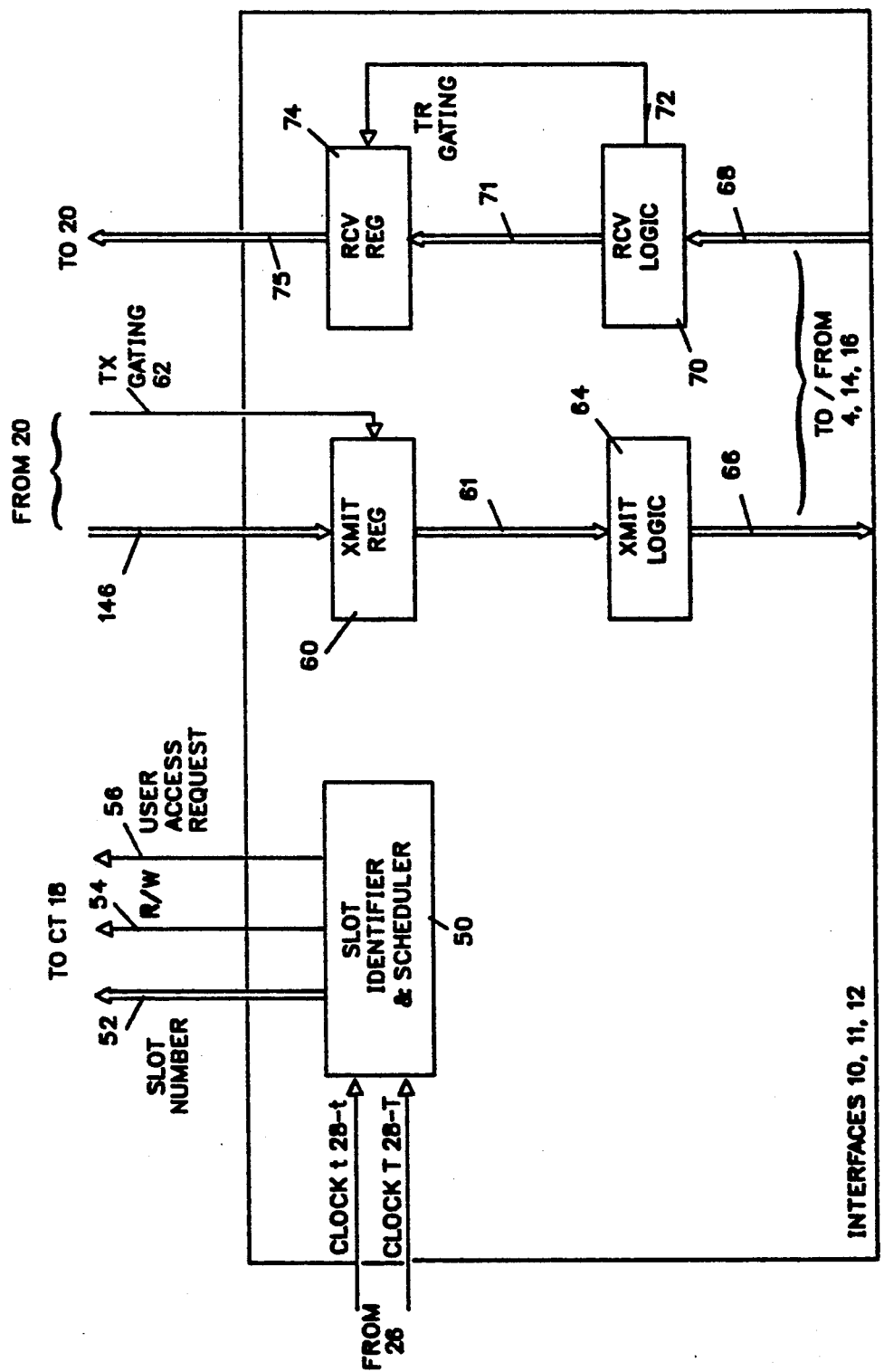
FIG. 4 shows the block diagram of the interfaces 10, 11 and 12 shown in FIG. 1.

FIG. 4 represents the block diagram of each interfaces 10, 11 and 12.

The interfaces comprise a slot identifier and scheduler circuit 50 which is similar in the interfaces 10 and 12 and different in the interface 11. The slot identifier and scheduler circuits 50-10 and 50-12 in the interfaces 10 and 12 are shown in FIG. 5 and the slot identifier and scheduler circuit 50-11 in the interface 11 is shown in FIG. 6.

The slot identifier and scheduler circuit 50 is controlled by timing signals on lines 28-T and 28-t from timing circuit 26. Timing circuit 26 provides an active pulse on line 28-T at the beginning of the period T and an active pulse on line 28-t at each period t, being with t having a value such that it is at least equal to the distribution buffer access cycle which is chosen to be as close as possible thereto so that, $$T = n \cdot k \cdot t$$

k being an integer number.

In a preferred embodiment of the invention, n and k are integer numbers which are equal to 2 sup 'm' and 2 sup 'j', with m=7 and j=5.

Thus, if the distribution buffer access cycle is 30 nanoseconds, n = 128 and T = 125 microseconds, there may be Ts/t=32 periods t in a time slot period Ts and 4096 periods t in a period T.

Slot identifier and scheduler circuit 50 generates a slot number value on bus 52 from the timing signals on lines 28-T and 28-t, which is the address used to address the configuration table CT 18. It also provides a read/write control signal R/W on line 54 and a user access request signal on line 56.

The interfaces also comprise a XMIT register 60 into which the data read from the distribution buffer DB 20 are gated under control of a Tx gating signal on line 62 to be transmitted outside the interface through a XMIT logic circuit 64 and bus 66.

The data received by the interface from bus 68 are provided to a RECEIVE logic circuit 70 which arranges them into slots which are gated by an active Tr gating signals on line 72 when a slot is ready, into a receive register 74 to be written into the distribution buffer at the right time, as will be described later on.

The XMIT and RECEIVE logic circuits 64 and 72 will not be described, since they are not part of the present invention.

In the preferred embodiment of the invention, interfaces 10 and 12 may have to make one read access and one write access to the distribution buffer 20 during every time slot Ts.

So, in these interfaces, the slot identifier and scheduler circuits 50-10 and 50-12 shown in FIG. 5, comprise a 12-bit counter 80 which is reset at the beginning of each period T by the signal on line 28-T and incremented at each period t by the signal on line 28-t. Counter 80 counts from 0 to 4095 during a period T. Consequently, the most significant bits 5 to 11 are the slot number bits, bit 4 is the read/write control signal provided on line 54 and the less significant bits 0 to 3 are decoded in decode circuit 82, which generates an active user access request signal UAR-10 or UAR-12 on line 56-10 or 56-12 respectively two times in each period Ts, when these bits take predetermined values which are specific to the interfaces. Thus, the user access request signals for interfaces 10 and 12 are active at different times in a period Ts. The period T is divided into TDM slots of duration Td=g.t with g =2 sup 'i', with i<<j. In the preferred embodiment of the invention i=2, so that Td=4t. During each period Td, the interface 12 may have the opportunity to access the distribution buffer 20 two times: one time for a read operation and one time for a write operation.

Consequently, the slot identifier and scheduler circuit 50-11 shown in FIG. 6 in interface 11 comprises a 12-bit counter 90, which is reset by the signal from line 28-T and incremented by the signal on line 28-t.

The less significant bit "0" of counter 90, provides a user access request window signal UARW-12 on line 92 which is active when the less significant bit of counter 90 is at 1. i.e two times in a Td period.

The following bit "1" of counter 90 provides the read/write control signal R/W on line 54-11 and the ten bits "2" to 4"11" constitute the TDM slot number provided on bus 94. A TDM access table TAT 96 which comprises 1024 positions, i.e. one position for each TDM slot in a period T, is addressed by the TDM slot number on bus 94.

In each communication system, once a TDM slot is assigned to one user among the 128 users of a time slot Ts, the slot number is written into the TDM access table 96 by the central control unit together with a validation bit V indicating that the TDM slot is assigned.

The information comprising the slot number and the validation bit is read from the TDM access table 96 and provided to register 98. The slot number part is provided on slot number bus 52-11 and the validation bit on line 102 is provided to gate 100 together with the UARW-11 signal on line 92. Thus, gate 100 provides on line 56-11 the user access request signal UAR-11 on line 56-11 during the interface access window if a slot is to be transferred through TDM bus switch 4 as indicated by the validation bit V.

The following table shows the values taken by the five less significant bits "0" to "4" of the counters 80 and 90 in interfaces 10 and 12 and in interface 11 and the corresponding signals UAR-10, UAR-12, UARW-11, and Read/Write R/W generated therefrom during each period Ts.

manager 110 is the slot number value present on bus 52-10, 52-11 or 52-12 when the user access request on line 56-10, 56-11 or 56-12, respectively is active.

Also, the communication control bits in the configuration table may be changed by the central control unit which provides the address of the configuration table location whose content is to be changed, together with the new communication control bits, a write control signal and an access request AR, through bus 22.

The access request AR is granted by the CT access manager 110 when no other user access request UAR is active, so that the new communication control bits can be written into the addressed location of the configuration table.

The new communication control information to be written into the configuration table 18 are provided by the configuration table access manager 110 on bus 114 together with the write control signal on line 116.

An address translator circuit 120, computes the distribution buffer address from the communication control information bits read from the configuration table 18,

```
Counter bits *4*3*2*1*0

*0*0*0*0*0*──▶*UAR-10  *0*0*0*0*1*──▶*UARW-11

*0*0*0*1*0*──▶*UAR-12  *0*0*0*1*1*──▶*UARW-11  *0*0*1*0*0

*0*0*1*0*1*──▶*UARW-11 *0*0*1*1*0  *0*0*1*1*1*──▶*UARW-11

*0*1*0*0*0  *0*1*0*0*1*──▶*UARW-11  *0*1*0*1*0

*0*1*0*1*1*──▶*UARW-11 *0*1*1*0*0*  *0*1*1*0*1*──▶*UARW-11

*0*1*1*1*0  *0*1*1*1*1*──▶*UARW-11

*1*0*0*0*0*──▶*UAR-10  *1*0*0*0*1*──▶*UARW-11

*1*0*0*1*0*──▶*UAR-12  *1*0*0*1*1*──▶*UARW-11  *1*0*1*0*0*

*1*0*1*0*1*──▶*UARW-11 *1*0*1*1*0  *1*0*1*1*1*──▶*UARW-11

*1*1*0*0*0  *1*1*0*0*1*──▶*UARW-11  *1*1*0*1*0

*1*1*0*1*1*──▶*UARW-11 *1*1*1*0*0  *1*1*1*0*1*──▶*UARW-11

*1*1*1*1*0  *1*1*1*1*1*──▶*UARW-11

*!─────────────────▶R/W-10 and R/W-12  ****!─────▶
R/W-11
```

When R/W=0 a write access is requested
When R/W=1 a read access is requested

Figure 7:
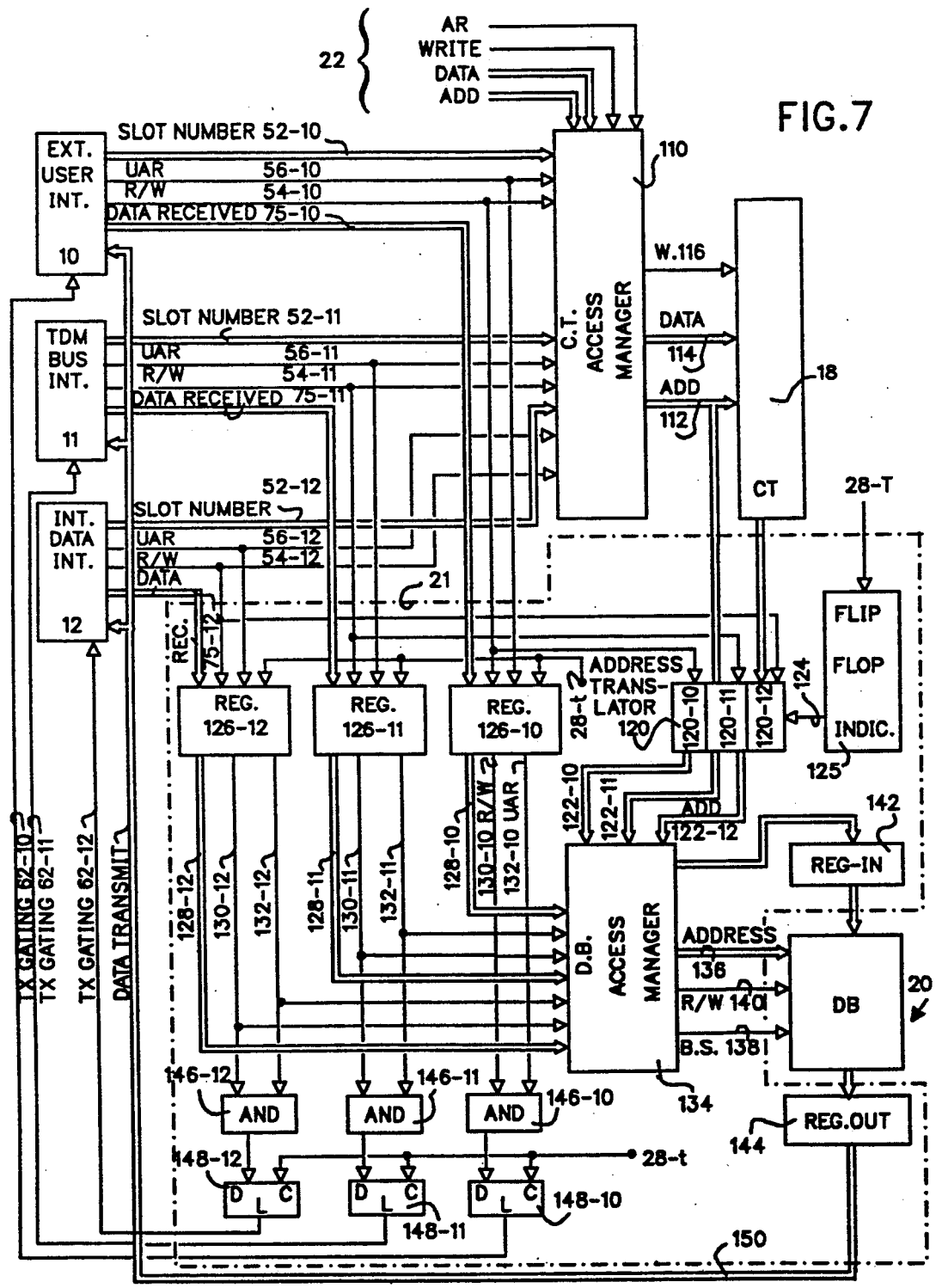
FIG. 7 shows the detailed implementation of the distribution mechanism 1 shown in FIG. 1.

FIG. 7 represents the arrangement of the configuration table CT 18 and the distribution buffer DB 20 in a communication system, together with the associated control circuitry.

The accesses to the configuration table CT 18 is controlled by a configuration table access manager 110 which is a logic circuit generating the addresses of the locations of the configuration table to be read at a given time of the periods T. The configuration table addresses are provided by the configuration table access manager 110 on address bus 112. These addresses are generated from the slot numbers on busses 52-10, 52-11 and 52-12 and the user access requests on lines 56-10, 56-11 and 56-12.

Since, the three interfaces 10, 11 and 12 activate their user access request lines at different times of each slot period Ts, there is no contention problem and the address provided on address bus 112 by the CT access the read/write control signals from lines 54-10, 54-11 an 54-12, the slot number on address bus 112, and the output signal on line 124 of flip/flop indicator circuit 125.

The address translator circuit 120 comprises three sub-circuits 120-10 120-11 and 120-12, each one receiving the common field of the communication control information read from the configuration table and the specific interface field SIF10, SIF11 and SIF12 respectively, the read/write control signal 54-10, 54-11 and 54-12 and flip/flop indicator signal on line 124. Sub-circuits 120-10, 120-11 and 120-12 generate distribution buffer addresses and corresponding byte select signals on busses 122-10, 122-11 and 122-12, respectively.

Flip/flop indicator signal on line 124 is taken into account by the address translator sub-circuits 120-10, 120-11 and 120-12 when the FF bit is set in the common field of the word read from the configuration table. When this mode is set, it is possible to bufferize frames in the flip buffer 40 in a period T while the slots to be transmitted are read from the flop buffer 41 and then to switch the flip and flop buffers every T period.

Flip/flop indicator circuit 125 is a modulo-2 counter which counts the pulses of the signal from line 28-T.

The slot number or the indirect address bits of the common field, if bit WD or RD is set to the indirect mode (depending upon whether the read/write control signal indicates a write or read operation), constitutes the less significant bit of the address 0 to 6. DC bits indicate which byte select line is to be activated. If the physical arrangement of the distribution buffer is as shown in FIG. 2, the values of bits WL/R, RL/R and FF and of the flip flop indicator indicate which part is to be accessed. If part 42 is to be accessed, the most significant bits 7 and 8 are set to 00, if part 43 is to be accessed, they are set to 10 if part 44 is to be accessed, they are set to 01 and if part 45 is to be accessed they are set to 11.

The data received on busses 75-10, 75-11 and 75-12, the user request access signal UAR on lines 56-10, 56-11 and 56-12 and the R/W signals on lines 54-10, 54-11 and 54-12 are provided to the D-inputs of D-type latches comprising registers 126-10, 126-11 and 126-12. The clock inputs of these register latches are connected to line 28-t. Thus, registers 126-10, 126-11 and 126-12 provide the received data bits delayed by t on their output busses 128-10, 128-11 and 128-12, the UAR signals delayed by t on output lines 132-10, 132-11 and 132-12 and the R/W signals delayed by t on output lines 130-10, 130-11 and 130-12.

Busses 128-10, 128-11 and 128-12 and lines 130-10, 132-10, 130-11, 132-11, 130-12 and 132-12 are provided to a distribution manager 134 together with the addresses and byte select signals generated by address translator 120 on busses 122-10, 122-11 and 122-12.

Each time a delayed user access request on one line 132-10, 132-11 or 132-12 becomes active, the corresponding address and byte select signal on bus 122-10, 122-11 or 122-12 is gated on distribution buffer address bus 136 and byte select control line 138. The corresponding R/W control signal on line 130-10, 130-11 or 130-12 is gated on data buffer R/W control line 136.

If the R/W signal on line 140 is indicative of a write operation, the corresponding delayed received data bits from bus 128-10, 128-11 or 128-12 are gated by the distribution buffer access manager 134 into the distribution buffer input register 142 to be written at the distribution buffer addressed location.

If the R/W control signal on line 140 is indicative of a read operation, the data read from the distribution buffer addressed location is written into the distribution buffer output register 144.

The delayed R/W and UAR signals on lines 130-10 and 132-10 are provided to AND gate 146-10, the delayed R/W and UAR signals on lines 130-11 and 132-11 are provided to AND gate 146-11 and the delayed R/W and UAR signals on lines 130-12 and 132-12 are provided to AND gate 146-12.

The output signals from AND gates 146-10, 146-11 and 146-12 are provided to the D-input of D-latches 148-10, 148-11 and 148-12, respectively, the clock input of these latches is connected to the line 28-t.

So, latches 148-10, 148-11 and 148-12 provide the Tx gating signals on lines 62-10, 62-11 and 62-12 at the right times when the content of the output register 144 of distribution buffer 20 can be gated in the transmit registers 60-10, 60-11 and 60-12 of the interfaces 10, 11 and 12 respectively, depending upon which user access request signal is active and if a read operation is requested.

The configuration table setting is performed either by an operator to establish internal local communications for example between two data handling means or for diagnostic purposes by copying the data from/to one user of a communication system into another communication system or by performing wrap tests on any of the interfaces 10, 11 and 12.

In operation, the CT fields are set to establish communications between users attached to a same communication system or to different communication systems.

A specific slot is assigned to the signalling function, the signalling information received in this slot is transferred to the central control unit through the TDM bus interface 11 and TDM switch 4.

From the signalling information it receives, the central control unit identifies the slots assigned to the calling and called parties in the communication systems to which the parties are attached. As a result the central control unit write the information in the configuration tables and the TDM access tables TAT of the TDM bus interfaces which are involved in the communication, if the parties are not attached to the same communication system.

If the calling and called parties are attached to the same communication system, only the configuration table of the communication system is to be written.

The information which are written in the configuration table specify the parties intervening in the communication and characterize the communication.

A plurality of communication modes may be defined:

Remote Mode

A slot from the network, received from a link 14 of a communication system can be routed to the TDM interface of the communication system, this slot carrying circuit or packet type information, and then it can be routed to a remote communication system. In the remote communication system, the packet type data may be routed to the data handling means through the data interface or to the network, the circuit type information can be routed to the network.

In this mode, the setting of the configuration table at the address of the slot, if a full duplex communication is to be established with the TDM interface for exchanging the data part only of the slot content, is the following:

1) Full duplex communication for a slot pertaining to a single 64 Kbps user:

To minimize the transit delay, the flip/flop function is not used.

The content of the configuration table at the address of the slot "x" assigned to the calling user attached to a first communication system is shown hereafter, the slot "x" address is written in the TDM access table at the TDM slot address Tdx assigned to this slot on the TDM bus. Configuration table setting:

COMMON FIELD: *SGN=*don't care *WD=1*direct addressing for the write operation *RD=1*direct addressing for the read operation *FF=0*no flip/flop mode SPECIFIC FIELD IF10: *ON/OFF=1*Interface 10 activated *DC=10*data only *WL/R=1*write in the left part of DB 20 *RL/R=0*read in the right part of DB 20

SPECIFIC FIELD IF *ON/OFF=1*Interface 11 activated *DC=10*data only *WL/R=0*write in the right part of DB 20 *RL/R=1*read in the left part of DB 20

SPECIFIC FIELD IF12 .ON/OFF=0*Interface 12 not activated*DC =*don't care *WL/R==*don't care *RL/R=*don't care 2) Several slots "x", "y", "z" etc.. are assigned to a single high speed user.

To be able to process any configuration of "aggregate" user slots, the flip/flop mode is set.

Content of the configuration table at address of slots "x","y", "z" etc.:
COMMON FIELD: *SGN=*don't care *WD=1*direct addressing for the write operation *RD=1*direct addressing for the read operation *FF=1* flip/flop mode SPECIFIC FIELD IF10: *ON/OFF=1*Interface 10 activated *DC=10*data only *WL/R=1*write in the left part of DB 20 *RL/R=0*read in the right part of DB 20

SPECIFIC FIELD IF11: *ON/OFF=1*Interface 11 activated *DC=10*data only *WL/R=0*write in the right part of DB 20 *RL/R=1*read in the left part of DB 20

SPECIFIC FIELD IF12: *ON/OFF=0*Interface 12 not activated *DC =*don't care *WL/R=*don't care *RL/R=*don't care 3) The control part of the slots are to be transferred to the data handling means:

Content of the configuration table at address of slots "x","y", "z" etc.:
COMMON FIELD: *SGN=*don't care *WD=1*direct addressing for the write operation *RD=1*direct addressing for the read operation *FF=1*flip/flop mode SPECIFIC FIELD IF10: *ON/OFF=1*Interface 10 activated *DC=11*data and control *WL/R=1*write in the left part of DB 20 *RL/R=0*read in the right part of DB 20

SPECIFIC FIELD IF11: *ON/OFF=1 Interface 11 activated *DC=10*data only *WL/R=0*write in the left part of DB 20 *RL/R=1*read in the right part of DB 20

SPECIFIC FIELD IF12: *ON/OFF=1*Interface 12 activated *DC=01*control only *WL/R=0*write in the left part of DB 20 *RL/R =1*read in the right part of DB 20

In the second communication system to which the called user is attached the setting of the information control information in the configuration table, will be identical in the locations having the addresses assigned to the slot(s) of the called user. These slot addresses will be written in the TDM access table at address Tdx and Tdy, Tdz etc..in case of a multi slot calling user)

Local Mode

A user slot from the network may be transferred to the local data handling means or may be transferred to the network to the same user (for performing wrap tests) or to another user to establish a communication between two users attached to the same system.

1) Transfer of the content (data and control) of a slot "x" to the data handling means:
COMMON FIELD: *SGN=*don't care *WD=1*direct addressing for the write operation *RD=1*direct addressing for the read operation *FF=0*no flip/flop mode SPECIFIC FIELD IF10: *ON/OFF=1*Interface 10 activated *DC=11*data and control *WL/R=1*write in the left part of DB 20 *RL/R=0*read in the right part of DB 20

SPECIFIC FIELD IF11: *ON/OFF=0*Interface 11 not activated *DC =*don't care *WL/R=*don't care *RL/R=*don't care SPECIFIC FIELD IF12: *ON/OFF=1*Interface 12 activated *DC=11*control only *WL/R=0*write in the right part of DB 20 *RL/R =1*read in the left part of DB 20

2) Transfer of a user slot "x" pertaining to link 14 to another user slot "y" also pertaining to link 14:
Information control information at slot address "x":
COMMON FIELD: *SGN=*address "Y"*WD=1-*direct addressing for the write operation *RD=0*indirect addressing for the read operation *FF=0*no flip/flop mode SPECIFIC FIELD IF10: *ON/OFF=1*Interface 10 activated *DC=11*data and control *WL/R=1*write in the left part of DB 20 *RL/R=0 read in the right part of DB 20 **(indirect address)

SPECIFIC FIELD IF11: *ON/OFF=0*Interface 11 not activated *DC =*don't care *WL/R=*don't care *RL/R=*don't care SPECIFIC FIELD IF12: *ON/OFF=0*Interface 12 activated *DC =*don't care =*WL/R=*don't care *RL/R=*don't care Information control information at slot address "y":
COMMON FIELD: *SGN=* address "x"*WD=1*direct addressing for the write operation *RD=0*indirect addressing for the read operation *FF=0*no flip/flop mode SPECIFIC FIELD IF10: *ON/OFF=1*Interface 10 activated *DC=11*data and control *WL/R=1*write in the left part of DB 20 *RL/R=0*read in the right part of DB 20 **(indirect address)

SPECIFIC FIELD IF11: *ON/OFF=0*Interface 11 not activated *DC =*don't care *WL/R=*don't care *RL/R=*don't care SPECIFIC FIELD IF12: *ON/OFF=0*Interface 12 activated *DC =*don't care *WL/R=*don't care *RL/R=*don't care 3) Wrap test for slot "x":
Information control information at slot address "x":
COMMON FIELD: *SGN=*don't care *WD=1*direct addressing for the write operation *RD=1*direct addressing for the read operation *FF=0* no flip/flop mode SPECIFIC FIELD IF10: *ON/OFF=1*Interface 10 activated *DC=11*data and control *WL/R=1*write in the left part of DB 20 *RL/R=0*read in the right part of DB 20 **(indirect address)

SPECIFIC FIELD IF11: *ON/OFF=0*Interface 11 not activated *DC =*don't care *WL/R=*don't care *RL/R=*don't care SPECIFIC FIELD IF12: *ON/OFF=O*Interface 12 activated *DC =*don't care *WL/R=*don't care *RL/R=*don't care Trace Mode A slot "x" from the network can be transferred to the data handling means of the local communication system and to the data handling means of a remote communication system to be copied into the data handling means of the remote communication system.

Information control information at slot address "x":

COMMON FIELD: *SGN=*don't care
*WD=1*direct addressing for the write operation
*RD=1*direct addressing for the read operation
*FF=0*no flip/flop mode SPECIFIC FIELD IF10: *ON/OFF=1*Interface 10 activated *DC=11*data and control *WL/R=1*write in the left part of DB 20 *RL/R=0*read in the right part of DB 20 **(indirect address)

SPECIFIC FIELD IF11: *ON/OFF=1*Interface 11 activated *DC =*11 *WL/R=*1 *RL/R=*0

SPECIFIC FIELD IF12: *ON/OFF=0*Interface 12 activated *DC =*00 *WL/R=*1 *RL/R=*0

The examples of communication control information which are given above are not limitative, they are only representative of specific communications which can be established. From the teaching of the description, it will be easy for a man skilled in the art to determine the communication control information to be written into the configuration table as a function of to be established communications.

We claim

1. In a communication system comprising a plurality of interfaces, (10,11,12) each interface connected to at least one user and able to receive and transmit information to said user(s) through information carrying means (14,3,17), a distribution mechanism for establishing communications between users selected by a central control unit, characterized in that the distribution mechanism comprises:

scheduling means (50) located in each interface (10, 11 and 12), and responsive to a common timing signal having a period T, to divide the period into n slot periods having a slot number, n being the number of users connected to that interface to which the maximum number of users are connected, a configuration table (18) comprising n locations, each location assigned to a slot period, the central control unit writing communication control information in each location, said table being addressed by the slot numbers generated by the scheduling means to read and make available, the communication control information, distribution buffer means (20) comprising at least a first and a second part (42,43), each part having n addressable locations, distribution buffer addressing means (120,134) responsive to the communication control information provided by the configuration table during each slot period to cause each interface involved in the to be established communications during that slot period, to write the information to be transmitted in one part of the distribution buffer and the information to be received by the interface to be read from the other part of the distribution buffer at addresses derived from the communication control information and the slot number generated by the scheduling means.

2. Distribution mechanism according to claim 1, characterized in that the interfaces are of three types, the first type is the external interface type (10) for connecting the communication system to network users, the second type is the internal interface type (12) for connecting information processing means (16) internal to the communication system to network users attached to the same communication system or to another communication system and the third type is the interconnection interface type (11) for connecting two communication systems through a time division multiplexing means (3-4) for transferring information between two communication systems in time division slots (Td), the interfaces of the external interface type being the interfaces which are connected to the maximum number of users.

3. Distribution mechanism according to claim 2 characterized in that the network users are attached to the interfaces of the external interface type through a serial link (14) on which a period T comprises n slot periods with at least one slot period assigned to one user and possibly a plurality of slots assigned to the same user depending upon the information transfer speed of the user, the slot period Ts=T/n is divided into k subperiods t with T=n.k.t, t being at least equal to the distribution buffer cycle such that T/n.t=k is an integer number each interface making at least a first and a second user access requests in a slot period in different subperiods t, and providing read/write control signals indicating whether a read or a write access is requested by the interface, the user access requests and read/write control signals causing the addresses of the location of the buffer which is to be accessed by the interface which makes the user access request to be derived from the communication control information read from the configuration table and sent to the distribution buffer addressing means together with the user access request signal and read/write control signals.

4. Distribution mechanism according to claim 3 characterized in that the scheduling means (50) in each interface is responsive to the first timing signal of period T and to a second timing signal of period t, to provide during each slot period, a slot number value, user access request signals (UAR) which are active two times in a slot period, with the user request signals generated by the scheduling means of the different interfaces activated during different subperiods t, the scheduling means also generating write and read control signals (R/W); the slot number (52), the user access request signals (56) and the write and read control signals (54) are provided to a configuration table addressing means (110), to cause the slot number value generated by the interface for which a user access request signal is active to be used as the address of the configuration table location which is read to derive the distribution buffer address.

5. Distribution mechanism according to claim 4 characterized in that n and k are such that 2 sup 'm'=n and 2 sup 'j'=k and the scheduling means (50-10 and 50-12) in the interface of the internal and external types comprises:

a binary counting means having x positions, with x=m+j numbered 0 to x-1, said counting means is set at an initial value by the first timing signal of period T and incremented by the second timing signal of period t, so as to provide the slot number in the most significant positions j to x-1, the write control signal active during one half of the slot period and the read control signal active during the other half of the slot period being derived from the binary value in the position j-1 and the user access request signals active during two different subperiods t being active when the binary values in the less significant positions 0 to j-2 take values which are assigned to each interface.

6. Distribution mechanism according to claim 5 characterized in that the scheduling means in the interface of the interconnection type comprises:

binary counting means having x positions numbered 0 to x-1, which are set to an initial value by the first timing signal at the beginning of each period T and incremented by the second timing signal, so as to divide the period T into n.k/g time division slots having a duration Td=g.t, with $g=2^i$ and $i<<j$, the number of the time division slots is indicated by the binary values in the most significant position i to x-1, the write control signal active during one half of each time division slot and the read control signal active during the other half of the time division slot are derived from the binary value in the position i-1, an access table having n.k/g positions, which are assigned by the central control unit to the time division slots of each period T to users attached to the internal or external interfaces by writing the corresponding slot numbers in the so assigned positions, said table being addressed by the time division slot number provided by the binary counting means, to read the information stored at the addressed location, which is the slot number indication provided by the scheduling means, logic means which are responsive to a specific binary value of the positions 0 to i-2 and to an indication that the addressed location of the access table contains an assigned slot, to generate the active user request signals.

7. Distribution mechanism according to any one of claim 3 to 6 characterized in that the communication control information in each location of the configuration table (18) comprises:

a common field into which the central control unit sets a read addressing mode control bit (RD) and a write addressing mode control bit (WD) to values which indicate whether the read and write operations in the distribution buffer have to be made in direct or indirect addressing mode, and writes the indirect address to be used if the read and /or write operation has to be made in indirect addressing mode, a specific field assigned to each interface, said field comprising an interface activation bit (ON/OFF) which is set on by the central control unit if the interface is involved in a communication during the time slot corresponding to the location, a bit (W L/R) which is set by the central control unit to indicate the distribution buffer part into which the interface has to write the information during that time slot and a bit (R L/R) which is set by the central control unit to indicate the distribution buffer part from which the interface has to read the information during that time slot.

8. Distribution mechanism according to claim 7, characterized in that the distribution buffer addressing means (120,134) comprise:

address translating means (120) which are responsive to the user access signals, the read/write control signals and the slot numbers generated by the interface scheduling means, and to the communication control information read from the configuration table to derive therefrom the address of the distribution buffer location to be read or written when one of the user access request signals becomes active, distribution buffer access controlling means (134) which are responsive to the user access request signals and read/write control signals delayed by a period t, to provide the address derived by the address translating means and the read/write control signal to the distribution buffer together with the information received from the interface for which the user request signal is active if the read/write control signal is indicative of a write operation, so as to write the information in the addressed location of the distribution buffer.

9. Distribution mechanism according to claim 8, characterized in that it comprises means for generating active transmit gating signals which are provided to the interface for which the user access request signal was activated during a period t, associated to a read/write control signal indicative of a read operation, 2t time periods later to transfer the information read from the addressed location to the interface for which the user request signal was activated.

10. A distribution device comprising:

a scheduling means which subdivides a common timing signal with a period T into n slots of subtiming period t;

a configuration table having n addressable locations with each of the n addressable locations being operable to store communication control information and addressable by slot numbers generated by the scheduling means; and a distribution buffer means with n addressable locations addressed by control information provided by the configuration table during each slot period to cause an interface to write the information to be transmitted in a location of said distribution buffer means or the information to be received by said interface to be read from another location of said distribution buffer means.

11. Distribution mechanism according to any one of claim 10 or. characterized in that the distribution buffer means is duplicated and comprise a flip buffer comprising a first and a second parts (42,43) and a flop buffer comprising a first and a second parts (44, 45) and the communication control information contains a flip/flop indicator bit which is set to a flip/flop operation mode when the to be established communication requires that the information be written in the flip or flop buffer and read from the flop or flip buffer respectively during a time slot, whereby any repartition of the time slots on the various interfaces is possible.

12. In a communication system comprising a plurality of interfaces, (10, 11 and 12) with each interface connected to at least one user and able to receive and transmit information to said user(s) through information carrying means (14, 3, 17), a distribution mechanism for establishing communications between users selected by a central control unit, characterized in that the distribution mechanism comprises:

in each interface, scheduling means, responsive to a common timing signal having a period T, to divide the period into n slot periods having a slot number, n being the number of users connected to that interface to which the maximum number of users are connected;

a configuration table (18) comprising n locations, each location assigned to a slot period, the central control unit writing in each location communication control information, said table being addressed by the slot numbers generated by the scheduling means to read and make available, the communication control information, distribution buffer means (20) comprising at least a first and a second part, each part having n addressable locations, addressed by addressing means responsive to the communication control information provided by the configuration table during each slot period to cause each interface to write the information to be transmitted in one part of the distribution buffer and the information to be received by the interface to be read from the other part of the distribution buffer at addresses derived from the communication control information and the slot number by the scheduling means.

* * * * *